(12) United States Patent
Ward

(10) Patent No.: US 8,769,391 B2
(45) Date of Patent: Jul. 1, 2014

(54) APPLICATION BROKER

(75) Inventor: Trevor H. Ward, Kars (CA)

(73) Assignee: Adobe Systems Incorporated, San Jose, CA (US)

( * ) Notice: Subject to any disclaimer, the term of this patent is extended or adjusted under 35 U.S.C. 154(b) by 757 days.

(21) Appl. No.: 12/546,533

(22) Filed: Aug. 24, 2009

(65) Prior Publication Data

US 2013/0212183 A1    Aug. 15, 2013

(51) Int. Cl.
*G06F 3/00*    (2006.01)

(52) U.S. Cl.
USPC ............................................................ 715/200

(58) Field of Classification Search
USPC .......................... 715/234, 243, 254, 255, 200
See application file for complete search history.

(56) References Cited

U.S. PATENT DOCUMENTS

| | | | |
|---|---|---|---|
| 7,016,057 B1 * | 3/2006 | Maruyama | 358/1.15 |
| 7,568,196 B2 | 7/2009 | Krebs | |
| 7,634,775 B2 * | 12/2009 | McLuckie et al. | 718/104 |
| 7,650,390 B2 | 1/2010 | Arner et al. | |
| 2006/0218036 A1 | 9/2006 | King et al. | |
| 2007/0233775 A1 * | 10/2007 | Jackson et al. | 709/201 |
| 2008/0005173 A1 | 1/2008 | Wilson et al. | |
| 2008/0155038 A1 * | 6/2008 | Bachmann et al. | 709/206 |
| 2009/0119679 A1 * | 5/2009 | Dowlan et al. | 719/313 |
| 2010/0058191 A1 | 3/2010 | Hawkins | |

OTHER PUBLICATIONS

"Getting Started with Form Guides," Adobe LiveCycle ES, Jul. 2007, 27 pages.
"Customizing Form Guides Using Flex Builder," Adobe LiveCycle ES, Jul. 2007, 51 pages.

* cited by examiner

*Primary Examiner* — Kyle Stork
(74) *Attorney, Agent, or Firm* — Finch & Maloney PLLC

(57) ABSTRACT

Methods, systems, and apparatus, including computer programs encoded on a computer storage medium, provide a broker for client applications. In one aspect, a method includes providing an electronic document that has a document format compatible with a document reader application. The electronic document includes a broker application and a client application. The broker application can be loaded into a virtual machine running in the document reader application on a client device. The loaded broker application loads the client application into the virtual machine, and the loaded client application provides a graphical user interface for display. In some instances, the loaded broker application receives data from the loaded client application and stores the received data as a data set in the electronic document. In some instances, the loaded broker application retrieves a data set from the electronic document and provides the retrieved data set to the loaded client application.

19 Claims, 5 Drawing Sheets

APPLICATION BROKER

BACKGROUND

This specification relates to a broker application for running internet applications. An internet application can run on a virtual machine provided on a client device. For example, a virtual machine can interpret SWF files that include Action-Script code, Pixel Bender code, and/or other types of internet application code. Examples of internet application platforms that include a virtual machine are Adobe Flash and Adobe AIR. Adobe Flash can execute on a client device as a standalone application or within an installed software application (e.g., a browser application, Adobe Acrobat, etc.) to run an internet application. Adobe AIR can execute in a desktop environment (e.g., provided by an operating system) to run an internet application independent of a browser application. Some Adobe AIR applications include offline functionality that allows the internet applications to operate without access to a remote server. Internet applications can be developed, for example, using Adobe Flex programming and/or Adobe Flash programming products.

SUMMARY

In general, one innovative aspect of the subject matter described in this specification can be embodied in methods that include the actions of providing an electronic document that has a document format compatible with a document reader application. The electronic document includes a broker application and a client application. The broker application is loaded into a virtual machine running in the document reader application on a client device. The loaded broker application loads the client application into the virtual machine, and the loaded client application provides a graphical user interface for display. In some instances, the loaded broker application receives data from the loaded client application and stores the received data as a data set in the electronic document. In some instances, the loaded broker application retrieves a data set from the electronic document and provides the retrieved data set to the loaded client application.

In one general aspect of the subject matter described in this specification, a system includes a server configured to provide an internet application to a client device by sending an electronic document to the client device over a data network. The electronic document includes the internet application and a broker application configured to load the internet application on the client device, receive information from the loaded internet application, and store the received information in the electronic document. Other embodiments of this aspect include corresponding systems, apparatus, and computer programs, configured to perform the actions of the methods, encoded on computer storage devices.

These and other embodiments can each optionally include one or more of the following features. The data received from the loaded client application includes data in a first data format, and the stored data set comprises data in a second data format. The loaded broker application generates the data set by converting the received data to the second data format. The broker application includes one or more scripts embedded in the electronic document, and the client application includes a file attached to the electronic document. The loaded broker application identifies the client application by scanning a list of items attached to the electronic document. The broker application is adapted to store the information received from the client application in the electronic document by invoking scripts of the document reader application. The graphical user interface includes a user-interactive form for information capture, and the data received from the client application includes information captured through the interactive form. The electronic document, which includes the data set, is sent to a second client device by electronic mail. The electronic document, which includes the data set, is sent to a remote application server over a data network. The client application is an internet application client. The internet application client invokes application services provided by a server application running on a remote server. The broker application emulates one or more services of the server application. The broker application is adapted to interface with multiple different client applications. The client device includes a display device that displays the graphical user interface and/or a user interface device that receives input from a user. The system also includes a second client device and/or a remote application server.

Particular embodiments of the subject matter described in this specification can be implemented so as to realize one or more of the following advantages. An internet application client can be conveniently e-mailed as an attachment to an electronic document. The internet application client can execute in an offline mode in a document reader application, allowing the internet application to operate independent of communications with a remote server. Internet application output data sets can be stored in the electronic document to which the internet application client is attached, allowing the internet application client and its data set to be stored and/or transported together. The broker application can allow a user to store and/or access internet application data sets locally on a client machine. The broker application can be a generic application configured to interface with multiple different client applications, so that the client applications do not have to be modified to run in the document reader environment or in an offline mode. For example, in some implementations, the client application does not include any special adaptations that allow it to run in an offline mode, but rather, the broker application facilitates running the client application in offline mode.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
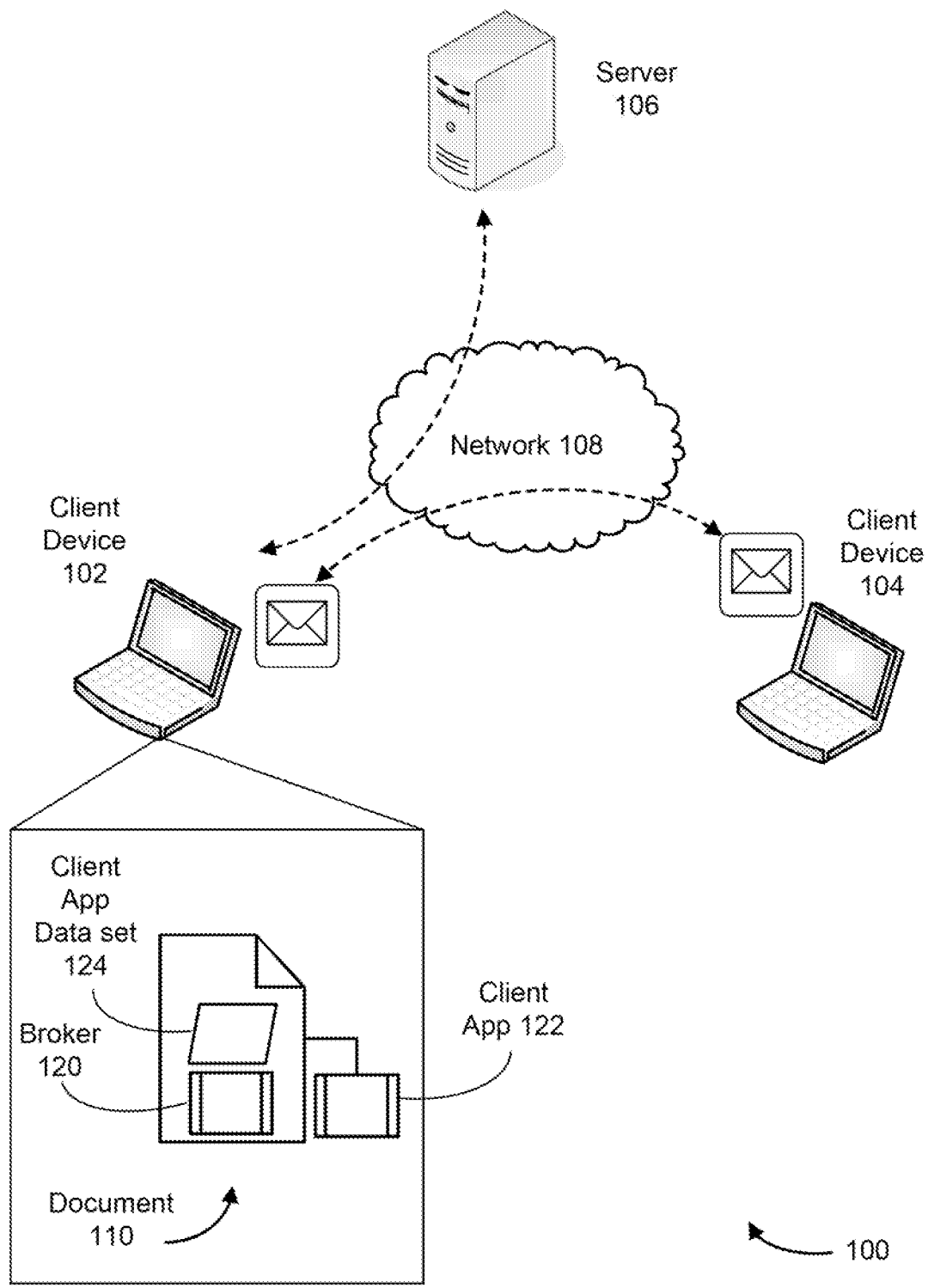
FIG. 1A is a diagram of an example system for using an electronic document to transmit an application and application data sets.

FIG. 1A shows an example system 100 for using an electronic document to transmit an application and application data sets. The system 100 includes client devices 102, 104 and server device 106 communicably coupled through a network 108. The system 100 can transmit applications and application data sets among client devices via electronic mail (i.e., e-mail), file transfer protocol (FTP), and/or other techniques for communicating electronic documents. For example, a first client device 102 can send an internet application client to a second client device 104 via e-mail. A so-called internet application client can be sent as an attachment to an electronic document, and the electronic document can include a so-called broker application that loads the internet application client and stores output data from the internet application client in the electronic document. Thus, the internet application client and its output data set(s) can inherit the portability and versatility of the electronic document, including the ability to run in an offline mode. For example, the electronic document, the broker application, and/or the an electronic document reader application can provide and/or emulate server application services, allowing the internet application client to run even when the internet application client does not have access to a server. For example, the broker application can emulate server application services by storing an application data set, by retrieving an application data set, by updating a version an application data set, by invoking local scripts to generate an output requested by the client application, and/or by performing other tasks.

The client device 102 includes a memory that stores an electronic document 110, and the client device 102 includes a document reader application that interprets electronic documents. In some implementations, the document reader application is the document reader application 222 of FIG. 2, discussed in more detail below. As one particular example, the electronic document can be a Portable Document Format (PDF) document and the document reader application can include Adobe Reader software, available from Adobe Systems Incorporated of San Jose, Calif., which can render graphical representations of PDF documents. Other example electronic document types include XML documents, Microsoft Word documents, and others. An electronic document (which for brevity will simply be referred to as a document) may, but need not, correspond to a file. A document may be stored in a portion of a file that holds other documents, in a single file dedicated to the document in question, or in multiple coordinated files. The client device may also includes an e-mail client application, a browser application, and/or another type of application that allows the client device 102 to send e-mails to and/or receive e-mails from the client device 104.

The document 110 includes a broker application 120 and a client application 122. As shown in FIG. 1A, the broker application 120 is an embedded application, where the data stream of the document 110 includes the broker application code and/or a reference to the broker application code. In some implementations, an object embedded in an electronic document is integrated in the content of the electronic document. For example, a media file embedded in an electronic document forms part of the content of the electronic document. A broker application may be wholly contained within an document, or a broker application may include information stored wholly or partially in an attached file and/or a remotely stored file. In some implementations, the broker application 120 is stored as a separate file and the document 110 includes a reference to the separate file that includes the broker application code. As shown in FIG. 1A, the client application 122 is an attached application, where the client application 122 code is stored outside of the data stream of the document 110. For example, an attachment to the document 110 can be data object that is separate from the document 110 and associated with the document 110 by a reference stored within the document 110. An attachment to a document is not part of the content of the document, but rather, an attachment is an associated object that is communicated and stored with the document. The client application 122 may be referenced and/or identified in a header and/or in the metadata of the document 110. A client application may alternatively or additionally include information stored wholly or partially in the data stream of a document and/or information stored wholly or partially in a separate file.

The document 110 includes a client application data set 124. The client application data set 124 includes output data generated by the client application 122 and in some cases processed by the broker application 120. The client application 122 can generate output data formatted for interpretation by a remote server application, and the broker application 120 can store the generated output data in the data stream of the document 110. For example, the output data can be received in a format that is compatible with a document reader application, and the broker application 120 can invoke scripts of the document reader application to store the received data in the document 110. In some cases, the broker application 120 can convert the output data to a different format. For example, the broker application can convert the output data to a format that can be stored in the data stream of the document 110 and/or a format that is compatible with the document reader application running on the client device 102.

In one aspect of operation, the client device 104 sends the document 110 to the client device 102 over the network 108. For example, the client devices 102, 104 may access e-mail client applications that communicate with e-mail servers in the network 108, and the document 110 can be sent as an attachment to an e-mail message. The document may be communicated between the client devices 102, 104 in another manner. For example, the client devices 102, 104 may have access to one or more file servers, a file sharing network, file transfer protocol applications, and/or the document 110 may be transferred by physical media (e.g., a disk, and/or another type of removable data storage).

In one aspect of operation, the client device 102 and/or the client device 104 runs the client application 122 in an offline mode, independent of communications with a remote device (e.g., the server 106). For example, the client device 102 can include a document reader application having a virtual machine, and the broker application 120 can be loaded on the virtual machine to facilitate the client application 122 running in an offline mode. For example, the virtual machine can facilitate the client application 122 running in an offline mode by emulating operations performed by a server application. In some implementations, the broker application 120 can emulate operations performed by a server application by receiving, converting and/or storing output data from the client application 122. In some implementations, the broker application 120 can emulate operations performed by a server application by invoking functions locally on the client device 102 to generate an output requested by the client application 122.

In a particular example, the client application 122 is a data capture application that prompts a user for certain types of information. For example, the data capture application can present a graphical user interface that includes data entry fields, pull-down menus, selection buttons, and/or other graphical user interface tools. The data capture application is designed to run in an online mode, where the data capture application can access functionality provided by a server application running on a remote server. For example, the data capture application can utilize the server application by sending the server application the data captured through the graphical user interface and by requesting that the server application generate a completed output "form" (e.g., a PDF document) based on the data. In an offline mode, the broker application 120 can emulate the services of the server application by receiving the data entered by the user and invoking local scripts (e.g., scripts that are stored and interpreted locally on the client device 102) that generate an output PDF document based on the received data. Additionally or alternatively, the broker application 120 can store received data in the document 110 and/or convert the received data to a data format that can be stored in the document 110 to be later interpreted by the server application. For example, the data received through the graphical user interface can be stored as the data set 124 in the document 110 while the client application 122 is running in offline mode, and the document 110 can later be sent to the server 106 so that the server 106 can process the data set 124.

Figure 1B:
FIG. 1B is a diagram of an example graphical user interface provided by a client application.

FIG. 1B shows an example graphical user interface 150 provided by an example data capture application client. In the example shown, the data capture application is an investment plan application form generator. The investment plan application form generator may be provided to a new customer of an investment service and may allow the new customer to interact with the graphical user interface 150. For example, the customer may enter date through data entry fields in the graphical user interface 150, and the client application may generate an output electronic document based on the entered data. As an example, the generated output electronic document can be a PDF of a completed investment service application form.

Generally, the system 100 can include a different number of client devices and/or a different number of application servers, and the network 108 can include at least a portion of multiple different data networks. Some aspects of the system 100 can be implemented on an enterprise scale or a web scale, allowing the system 100 to accommodate client devices, network resources, and application servers for hundreds, thousands, or more users.

Figure 2:
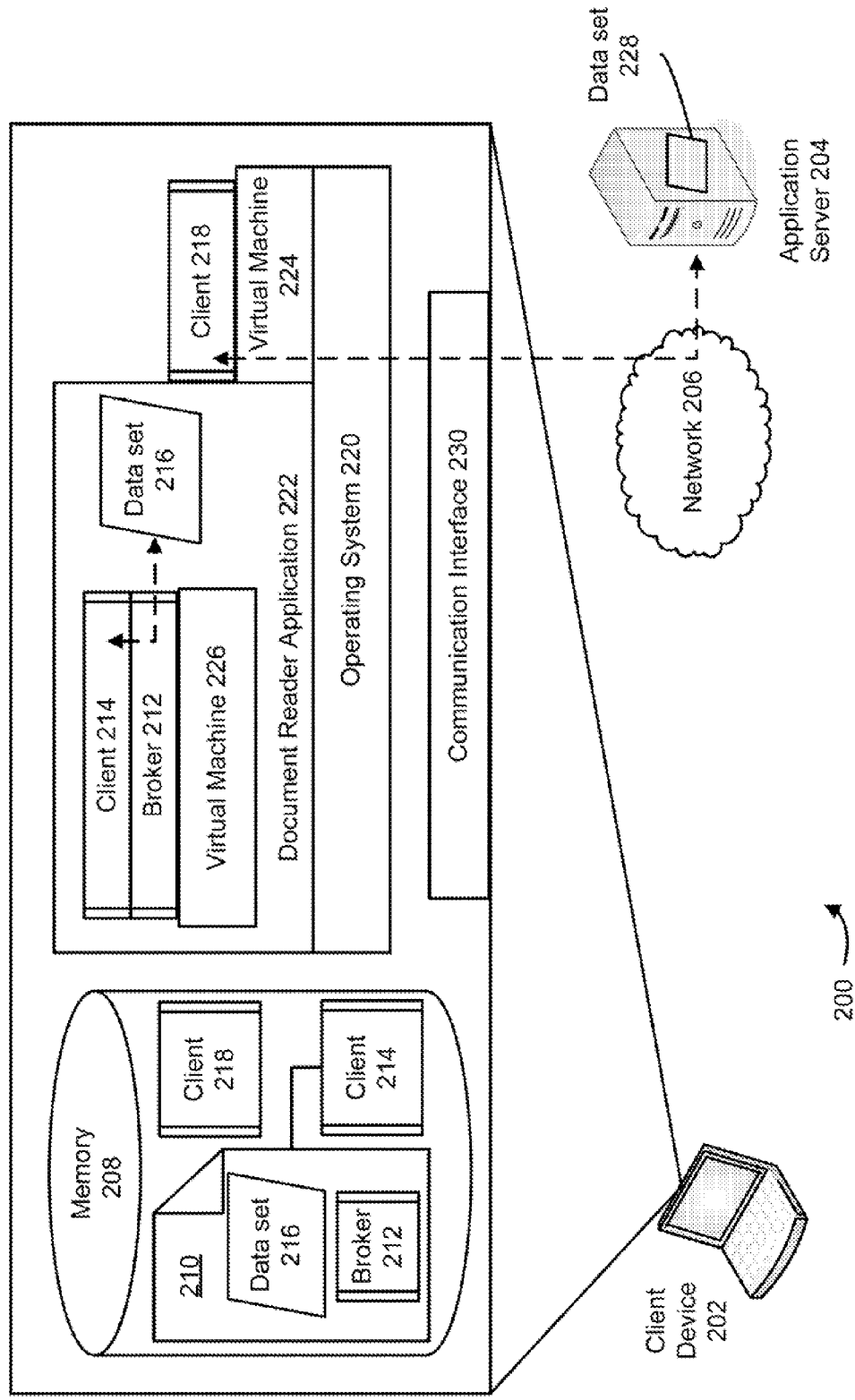
FIG. 2 is a diagram of an example system for using an electronic document to communicate an application and application data sets.

FIG. 2 shows an example system 200 for using an electronic document to communicate an application and application data sets. The system 200 includes a client device 202 and an application server 204. The client device 202 and the application server 204 communicate through the data communication network 206, which may include one or more private networks (e.g., an enterprise network, a personal network, etc.) and/or one or more public networks (e.g., the Internet, etc.).

The client device 202 includes a memory 208 that stores an electronic document 210. The document 210 includes an embedded broker application 212, an embedded application data set 216, and an attached client application 214. The memory 208 can store additional electronic documents and/or other types of data, such as an additional client application 218.

In some implementations, the client device 202 runs an operating system 220 that manages software and/or hardware resources of the client device 202. For example, the operating system 220 can access and/or control aspects of the memory 208, processor(s), storage device(s), input/output device(s), network communication interface(s), and/or other hardware components that may be included in the client device 202. The operating system 220 includes and/or has access to printing resources, network resources, file system resources, and other resources. Also, the operating system 220 can load software applications and expose the lower-level resources of the client device 202 (e.g., printing resources, network resources, memory resources, processing resources, and/or others) to the loaded applications. In the example shown, the operating system 220 has loaded a document reader application 222 and a virtual machine 224. The operating system 220 can coordinate the allocation of resources among multiple applications loaded on the client device 202. In other implementations, the client device 202 does not require an operating system. Example operating systems include Microsoft Windows, Mac OS, Unix, Linux, Sun OS, and others. In some implementations, the client device 202 is a handheld wireless device, and the operating system 220 may be implemented using iPhone OS, BREW, Java ME, Google Android, Palm WebOS, MS Windows Mobile, and/or another type of application platforms for a mobile device.

The client device 202 can include a browser application (not shown in FIG. 2). The browser application is separate from the document reader application 222. Generally, a browser application sends requests (e.g., a Hypertext Transfer Protocol request including a Uniform Resource Locator, or another type of request) to one or more servers, interprets response(s) (e.g., a web page, or another type of response) received from the server(s), and displays the interpreted response(s). Example browser applications include Microsoft Internet Explorer, Mozilla Firefox, Google Chrome, Apple Safari, Opera, Opera mobile, Fennec, and others. Some browser applications include virtual machines for running internet applications.

The document reader application 222 interprets electronic documents. In some implementations, the document reader application 222 is an installed software application for viewing and editing electronic documents, for example, Adobe® Reader® software (available from Adobe Systems Incorporated), Adobe® Acrobat® software (available from Adobe Systems Incorporated), and/or others. The document reader application 222 can receive the document 210 from the memory 208 (e.g., using the file system resources provided by the operating system 220), interpret the received document 210, generate a graphical representation of the document 210, and/or perform other operations and invoke software functions based on information included in the document 210. In further implementations, the reader application 222 can receive the document 210 over a network connection. For example, the graphical representation of the document 210 can be presented on a display device. In some cases, the graphical representation of the document 210 includes a graphical user interface for invoking one or more of the broker application 212 or the client application 214. For example, the graphical representation of the document 210 may include a button or a hyperlink selectable by a user.

The virtual machine 226 can be included in an application platform. The virtual machine 226 can interpret source code of the client application 214 and provide resources to the client application 214 by emulating lower-level protocol layers (e.g., an operating system layer and/or physical layers), for instance. The virtual machine 226 can facilitate communication between client applications running on the virtual machine 226 and the remote application server 204, for example, by utilizing the network resources of the operating system 220.

The virtual machine 226 can include one or more interpreters that interpret source code of an client application. The interpreter(s) may interpret source code having one or more formats, for example, C, C++, Javascript, ActionScript, Pixel Bender, and/or others. In some implementations, the virtual machine 226 can interpret bytecode based at least in part on the source code of an application. The virtual machine 226 can include multiple interpreters. As an example, the virtual machine 226 can include a first interpreter for interpreting bytecode based on ActionScript source code and a second interpreter for interpreting bytecode based on Adobe Pixel Bender source code. In some instances, the virtual machine 226 can generate multimedia representations, interactive graphical user interfaces, animated graphic objects, and/or other types of output that can provide a rich user experience.

The virtual machine 226 can be utilized by the document reader application 222, for example, based on instructions in an electronic document. One example of a virtual machine 226 that can operate as an application platform is the Adobe Flash platform. For example, a document reader application (e.g., Adobe Acrobat, and others) may include an embedded application platform. As shown in FIG. 2, a virtual machine 224 may also be loaded directly by the operating system 220. As such, the virtual machine 224 can operate independent of a web browser application. One example of a virtual machine that can be loaded by an operating system is the Adobe AIR platform. Analogous to the virtual machine 226, the virtual machine 224 can interpret source code of client applications and provide resources to the client applications by emulating lower-level protocol layers.

A virtual machine can load multiple client applications, and in some cases, a loaded client application can load another client application onto the virtual machine by loading the other client application onto itself. For example, as shown in FIG. 2, the broker application 212 has loaded the client application 214 onto itself. An client application can include one or more SWF files and/or other types of files that can be interpreted by the virtual machine. Example client applications include Adobe Form Guides (a data capture application), Adobe Buzzword (a web-based word processor), Adobe ConnectNow (a web-based meeting software), Acrobat.com Tables (a web-based spreadsheet), Acrobat.com Presentations (a web-based presentation approach), and others.

Either or both of the client applicants 214 and 218 can be internet application clients. In some cases, basic functionality of an internet application client makes substantial use of both local execution of instructions on the client device and communications with an external server over the Internet or another type of data network. For example, an internet application client may rely at least partially on the application servers 204 for data storage, data versioning, and/or data update distribution. As another example, an internet application client may utilize the application server 204 for functionality associated with data access control, data encryption, data authentication, presence data distribution, multi-user chat, video conferencing, multi-user collaboration, and/or other functions. Other aspects of an internet application client may be adapted to function independent of the external server, relying only on local execution of instructions on the client device. For example, an internet application client typically generates a user interface based on local execution of instructions on the client device. As another example, an internet application client can execute instructions locally to edit the content of an internet application data set, to interpret internet application data sets, to generate new internet application data sets, and/or to perform other functions. An internet application client can provide a rich user experience, for example, by providing a dynamically updated and/or animated graphical user interface.

The client applications 214 and 218 can generate, modify, and/or interpret application data sets and/or application data objects. The client applications 214 and 218 can provide a graphical representation of interpreted data. An application data set or application data object can be formatted (e.g., according to a schema) for a particular client application, and the client application can include instructions for interpreting the data set or data object. For example, the application can be a word processing application, and the application data object can be a word processing document formatted for the word processing application. As another example, the application can be a data capture application that provides a rich graphical user interface for data entry, and the application data set can include the information captured through the rich graphical user interface. The data capture application can interpret the application data set and generate an output electronic document representing the captured data. The application data set and/or the application data object can be transmitted to an application server for processing, storage, modification, and/or distribution.

In the example shown in FIG. 2, an application data set 228 is formatted for the client application 218 running on the virtual machine 224. The client application 218 can retrieve the application data set 228 from the application server 204 over the network 206, update and/or modify the application data set 228, send the application data set 228 to the application server 204 over the network 206, and/or perform other operations with respect to the application data set 228.

In the example shown in FIG. 2, an application data set 216 is formatted for the client application 214 running on the virtual machine 226. In some instances, the client application 214 can retrieve the application data set 216 from the application server 204 over the network 206, update and/or modify the application data set 216, send the application data set 216 to the application server 204 over the network 206, and/or perform other operations with respect to the application data set 216. In some instances (such as in the example shown in FIG. 2), the broker application 212 receives the application data set 216 from the client application 214 and stores the application data set 216 in the electronic document 210. The broker application 212 can also retrieve the application data set 216 from document 210 to allow the client application 214 to load the application data set 216. In this manner, the client application 214 can run in an offline mode, receiving support from the broker application 212.

The application data set 216 can include data stored in an extensible markup language (XML) format, XML Forms Architecture (XFA) format, or in another data format. The data set 216 can include data generated by the client application 214. The data set may be stored in the document 210 using scripts defined in the document 210 and/or functions of the document reader application 222. For example, the broker application 212 can invoke scripts in the document 210 and/or functionality provided by the document reader application 222 to store and/or convert data received from the client application 214. In some implementations, the broker application 212 can store the data set 216 in the document 210 without special or extra processing by a server device or a client device.

In an example implementation, the broker application 212 is an embedded SWF file, and the document 210 is an XFA-based PDF document that includes one or more scripts that enable communication between the PDF document and the broker application 212. The scripts in the document 210 can expose functions (e.g., functions of the reader application 222, and/or other functions) that the broker application 212 calls in order to get and/or put attachments, to get and/or put data sets, to submit data sets, to open and/or save data sets, and/or to perform other operations. The broker application 212 can allow the data storage model for client application 214 to be schematically separate from the manner in which data is presented by the client application 214. The client application 214 can generate an XML data set based on an XML schema, an XML data set compatible with XFA, and/or another type of data set. The data set 216 stored in the document 210 can include an XML data set based on an XML schema, an XML data set compatible with XFA, and/or another type of data set. As an alternative, the data set 216 can be stored as an attachment to the document 210 which may allow more generic access to the data set 216 in some implementations. The broker application 212 can be configured to handle PDF javascript.

The format of the data set 216 stored in the document 210 may depend on what systems are expected to process the data set, for example, in order to leverage existing systems architecture. Data sets having XFA data format and/or XML data format can be stored in a PDF document and/or can be interpreted using Adobe LiveCycle software. Thus, storing the data in the XFA data format can facilitate further processing by the document reader application 222 and/or a server application. Storing data as an XFA data set in the document 210 may allow the document 210 to pass certification tests. In some cases, for example in a data capture application, an output PDF document can be generated based on an XFA data set. As such, the XFA data format may facilitate generation of an output PDF document that has both web and print accessibility without requiring any changes to the document source.

In the example shown in FIG. 2, both client applications 214, 218 are adapted to access the functionality of a server application running on a remote server, such as the application server 204. As shown in FIG. 2, the client application 218 runs in an online mode and accesses application services provided by the application server, and the client application 214 runs in an offline mode (for example, during a time when the client device does not have access to the network 206 and/or to the application server 204) independent of a remote server. For example, whereas the client application 218 running in online mode retrieves an application data set 218 from the application server 204, the client application 214 running in offline mode retrieves an application data set 216 from the document 210 stored in the local memory 208. In the example shown, the client application 214 does not include any special adaptations that allow it to run in an offline mode, but rather, the broker application 212 facilitates running the client application 214 in offline mode. For example, the broker application 212 can facilitate storing and/or retrieving data sets stored in the document 210.

The broker application 212 embedded in the document 210 can be loaded onto the virtual machine 226 based on instructions included in the document 210 and/or based on input received from a user (e.g., a user selection of a hyperlink, a button, or another type of user interface). The document 210 can be a bootstrap document that defines functions for loading the broker application 212. The broker application 212 can be an SWF file or another type of file. The broker application 212 can include source code formatted as C, C++, ActionScript, javascript and/or other types of source code.

The broker application 212 embedded in the document 210 can detect an client application attached to the document 210. For example, the broker application 212 can scan a list of attachments (e.g., which may be included in the metadata and/or in another portion of the document 210) and identify one or more of the attachments as client applications. The client applications may be identified by the broker application 212 based at least in part on a file type, a file extension, a file name, and/or other types of identifying information included in the attached application and/or in the document 210. The broker application 212 may execute a SWF loader script to identify and/or load an attached SWF file. In some implementations, the broker 212 can automatically load the first client application identified in the attachments to the document 210.

The broker application 212 embedded in the document 210 can facilitate interactions between the client application 214 and one or more of the virtual machine 226, the document reader application 222, the application server 204, and/or the document 210. For example, the broker application 212 can utilize the resources of the document reader application 222 to interpret and/or edit the document 210 based on data received from the client application 214, the broker application 212 can access the resources of the virtual machine 226 to interpret source code and/or bytecode of the client application 214, the broker application 212 can utilize the resources of the operating system 220 to allow the client application 214 to communicate over the network 206, and/or the broker application 212 can utilize other resources.

In some examples, the document 210 is a generic bootstrap PDF document that includes scripts that supports operation of any one of multiple different client applications (any of which may be attached to the document 210), and the broker application 212 can invoke the scripts to execute the supported operations. For example, the bootstrap PDF may define scripts (e.g., functions, commands, etc.) that support interaction with multiple application programming interfaces (APIs). As a particular example, the bootstrap PDF may include scripts that support interaction with Adobe Reader's javascript API. The broker application 212 can invoke these scripts to broker interactions between the client application 214 and the document reader application 222 (i.e., in this example, the Adobe Reader or Adobe Acrobat applications). As another particular example, the bootstrap PDF may include scripts that support interaction with XFA javascript APIs. The broker application 212 can invoke these scripts to perform operations (e.g., generate, retrieve, modify, etc.) on XFA Data sets. The operations supported by the embedded scripts may include opening, printing, saving, e-mailing, and/or other operations on attachments to the document 210. The operations supported by the embedded scripts may include exporting data sets, importing data set, submitting data sets and/or other operations based on an application data set. The operations supported by the embedded scripts can be maintained using the Adobe LiveCycle Design tool. The generic bootstrap PDF can be renamed once attachments have been added, making it an internet application PDF.

In an example implementation, the client application 214 is a data-capture application that provides a dynamic graphical user interface that prompts a user to enter certain types of data. The broker application 212 can receive that data entered in the graphical user interface by a user and store the data in the document 210. In some implementations, the broker application 212 converts the data received from the client application 214 to a different data format, such as an XFA data set. In some implementations, the broker application 212 stores the data received from the client application 214 in the same data format in which it is received. The example application 214 can provide a user interface (e.g., a "print" button, or another type of interface) that allows the user to request that captured data be transferred to an output documents (e.g., a completed PDF form, or another type of output document). When such a request is received by the client application 214, the broker application 212 facilitates generation of the output document and/or passing data to the output document. When the output document is generated based on one or more XFA data sets, the output document can be dynamically created based on the data provided, or the output document may be a static document that receives the provided data. The broker application 212 may also facilitate importing data, exporting data, sending and/or receiving data from a remote server application, and other operations.

Figure 3:
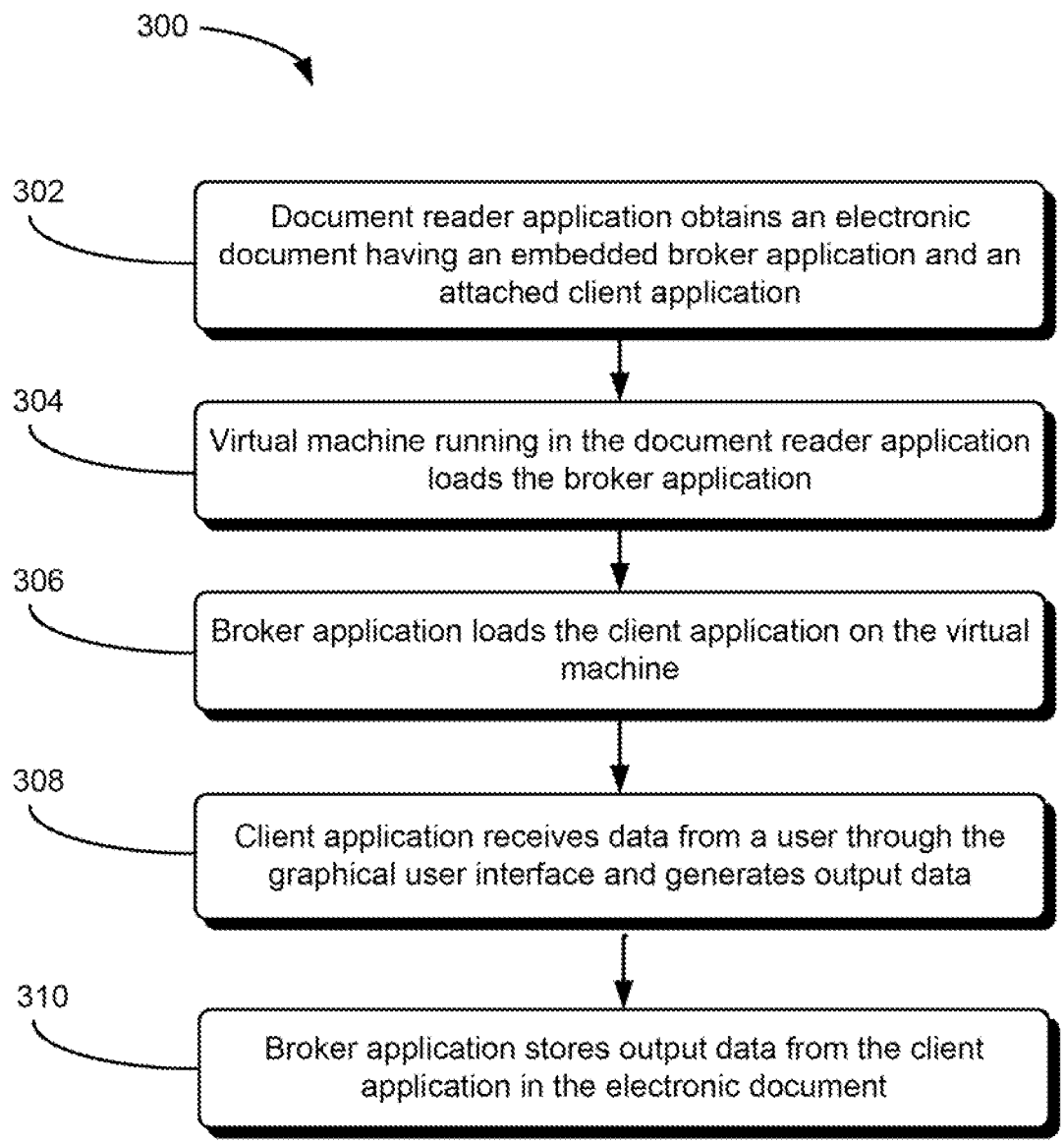
FIG. 3 is a flow chart showing an example technique for using an application broker to run an internet application.

FIG. 3 is a flow chart showing an example process 300 for using an application broker to run an internet application. For example, the process 300 can be used to run a the client application 122 of FIG. 1A and/or the client application 214 of FIG. 2. The process 300 can include fewer, additional, and/or different operations.

At 302, a document reader application running on a client device obtains an electronic document having an embedded broker application and an attached client application. The electronic document can be provided to the client device, for example, by a remote server and/or from another client device through a data network, through a storage device, and/or in another manner. The client application provides a graphical user interface and generates output data in a first data format. For example, the graphical user interface may include a graphical user interface having a user-interactive form for capturing information, and the output data can include information captured through the interactive form. The client application can be an internet application configured to invoke application services provided by a remote application server, and the broker application can emulate one or more services of the remote application server.

The broker can store data received from the client application in the document. The broker can also retrieve data from the document and provide the retrieved data to the client application. In some implementations, the broker application can invoke one or more functions to convert data between data formats. The broker application can be adapted to interface with multiple different client applications. As such, many different client applications can be attached to the electronic document, and the broker application may be compatible with any and/or all of the attached client applications. Consequently, neither the electronic document nor the embedded broker application need to be modified to interface with any particular client application that can be attached to the electronic document.

At 304, a virtual machine running in the document reader application loads the broker application. At 306, the loaded broker application loads the client application on the virtual machine. In some cases, before loading the client application, the loaded broker application identifies the client application by scanning a list of items attached to the electronic document. The broker application and the client application can both be SWF files, and the broker application can load the client application onto itself. Once loaded, the client application provides a graphical user interface for display. For example, the graphical user interface can displayed to a user on a display device. At 308, the client application receives data from the user through the graphical user interface and generates output data.

At 310, the broker application stores the output data from the client application in the electronic document. In some cases, the broker application can receive output data from the loaded client application and store the received data in the document. In some cases, the received output data has the first data format, and the broker application can convert the received output data to the second data format for storage in the electronic document. The broker application can store the data in the electronic document as a document object and/or a data set. The broker application can retrieve the stored data set and/or another stored data set from the electronic document and provide the data set to the client application. In some implementations, the process 300 further includes sending the electronic to a second client device by electronic mail and/or sending the electronic document to a remote application server over a data network. The electronic document sent to the remote client device and/or the remote server device may include the output data set.

The techniques described herein may be implemented by a computing device configured to provide the functionality described. In various embodiments, a computing device may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Figure 4:
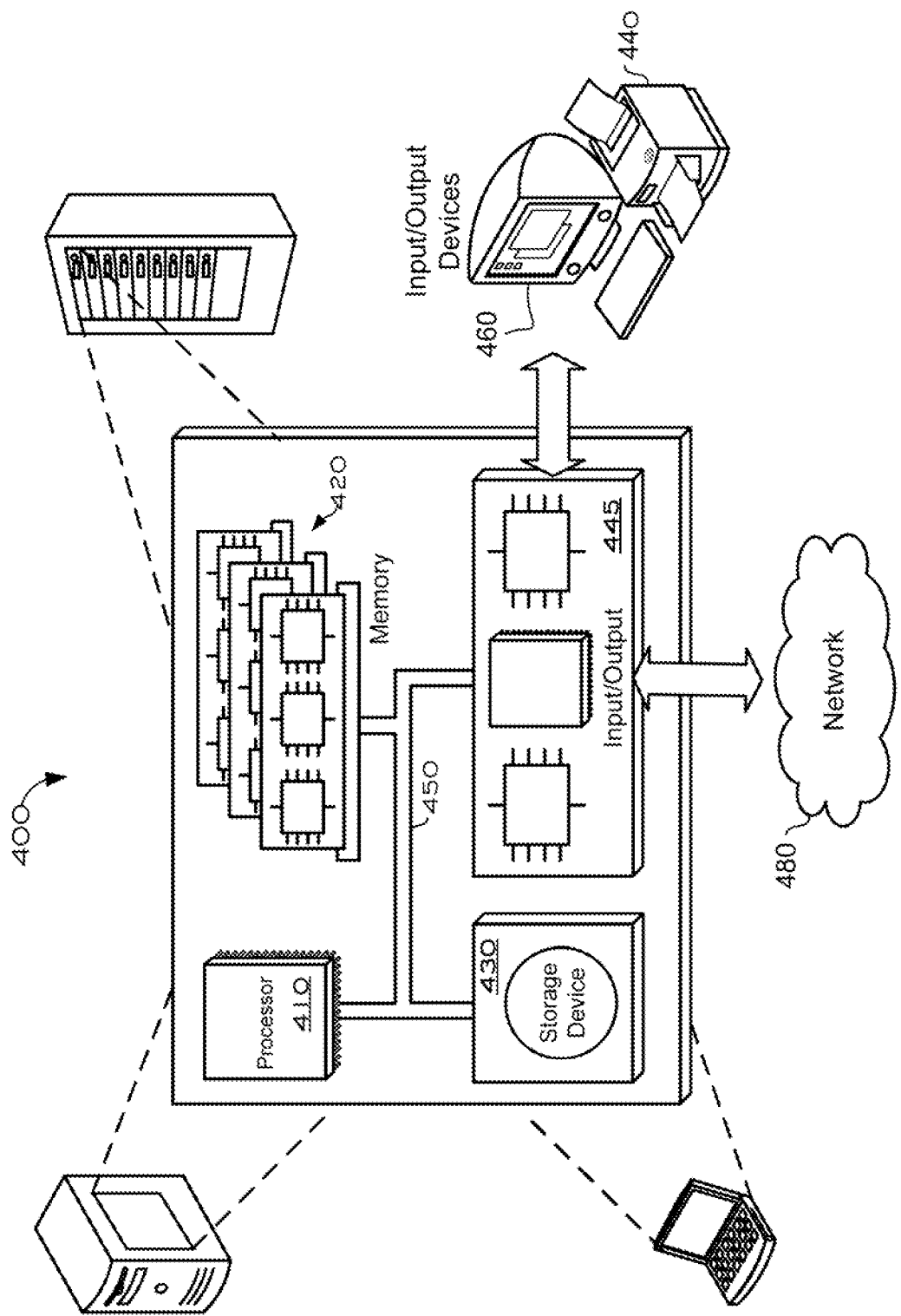
FIG. 4 is a diagram of an example computing system.

FIG. 4 is a block diagram showing an example computing device 400. In some instances, the example computing device 400 can function as a client device (such as the client device 102 of FIG. 1A), as a server device (such as the server device 106 of FIG. 1A), and/or as another type of device. For example, the computing device 400 can function as a client device running one or more internet applications. As another example, the computing device 400 can function as a server device running one or more server applications that provide support to an internet client application running on a remote client device.

The example device 400 includes a processor 410, a random access memory (RAM) 420, a storage device 430 (e.g., a writable read-only memory (ROM) and/or another type of storage device), and an input/output (I/O) controller 445 coupled by a processor (CPU) bus 440. The system 400 can be preprogrammed and/or it can be programmed (and reprogrammed) by loading a program from another source (e.g., from a CD-ROM, from another computer device through a data network, and/or in another manner). The I/O controller 445 is coupled to input/output devices 450, 460 and to a network 480. The input/output devices shown include a monitor 450 and a printer 460. Additional, fewer, and/or different input/output devices may be included. The devices 450, 460 receive and transmit data in analog or digital form over communication links such as a serial link, wireless link, parallel link, and/or another type of link. The network 480 can include any type of data communication network. For example, the network 480 can include a wireless and/or a wired network, a Local Area Network (LAN), a Wide Area Network (WAN), a private network, a public network (such as the Internet), a WiFi network, and/or another type of data communication network.

The memory 420 and/or the storage device 430 can store instructions (e.g., computer code) associated with an operating system, computer applications, and/or other resources. The memory 420 and/or the storage device 430 can also store application data and data objects that can be interpreted by one or more applications and/or virtual machines running on the device 400. The processor 410 can execute instructions, for example, to generate output data based on data inputs. As one particular example, the processor 410 can generate a data set for storage in an electronic document (e.g., a PDF document) based on an internet application interpreting a data object. In examples where the device 400 is a client device running an internet application client, the input/output controller 445 can send messages from the internet application client to a remote server through the network 480, and the input/output controller 445 can receive responses from the remote server and/or from another device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing an electronic document having a document format compatible with a document reader application, the electronic document having included therein a broker application, a client application and a dataset;
after the document reader application is used to open the electronic document at a client device, executing the broker application using resources provided by a virtual machine running in the document reader application;
using the broker application to load the client application into the virtual machine, the virtual machine providing resources to the loaded client application by emulating one or more protocol layers of the client device;
generating, by the client application, a graphical user interface that includes an interactive form for collecting information from a user accessing the electronic document using the document reader application;
providing, from the client application to the broker application, the information provided by the user to the interactive form; and
using the broker application to store the information in the dataset that is included in the electronic document.

2. The method of claim 1, further comprising using the broker application to retrieve the information in the dataset and provide the retrieved information to the client application.

3. The method of claim 1, wherein:
the information provided from the client application to the broker application comprises data in a first data format;
the dataset comprises data in a second data format; and
the broker application is further configured to generate the dataset by converting the information to the second data format.

4. The method of claim 1, wherein the broker application includes one or more scripts embedded in the electronic document and the client application includes a file attached to the electronic document.

5. The method of claim 1, wherein:
the broker application includes one or more scripts embedded in the electronic document and the client application includes a file attached to the electronic document; and
the broker application is further configured to identify the client application by scanning a list of items attached to the electronic document.

6. The method of claim 1, wherein providing the electronic document includes at least one of:
sending the electronic document to the client device from a second client device by electronic mail; and
sending the electronic document to the client device from a remote application server over a data network.

7. The method of claim 1, wherein the client application comprises an internet application configured to invoke application services provided by a server application running on a remote server.

8. The method of claim 1, wherein:
the client application comprises an internet application configured to invoke application services provided by a server application running on a remote server; and
the broker application emulates one or more services of the server application.

9. The method of claim 1, wherein the broker application is adapted to interface with a plurality of different client applications.

10. A non-transitory computer storage medium encoded with a document reader application, the document reader application comprising instructions that when executed by a client device cause the client device to perform operations comprising:
opening an electronic document formatted for the document reader application, the electronic document comprising a broker application, an internet application client, and a dataset for the internet application client;
executing the broker application using resources provided by a virtual machine running in the document reader application;
using the broker application to load the internet application client into the virtual machine, the virtual machine providing resources to the loaded internet application client by emulating one or more protocol layers of the client device;
using the broker application to retrieve the dataset from the electronic document;
providing the retrieved dataset from the broker application to the internet application client; and
using the internet application client to generate a graphical user interface that is capable of displaying information extracted from the dataset.

11. The computer storage medium of claim 10, wherein:
the broker application includes one or more scripts embedded in the electronic document;
the internet application client includes a file attached to the electronic document; and
the operations further comprise using the broker application to identify the internet application client by scanning a list of items attached to the electronic document.

12. The computer storage medium of claim 10, wherein the operations further comprise using the broker application to:
receive information provided by a user to an interactive form that forms part of the graphical user interface generated by the internet application client; and
store the received information in a second dataset that is included in the electronic document.

13. The computer storage medium of claim 10, wherein the operations further comprise receiving the electronic document from a server that is configured to send the electronic document to a plurality of client devices.

14. The computer storage medium of claim 10, wherein the broker application is adapted to interface with a plurality of different internet application clients.

15. A computing system that comprises:
a server including a communication interface;
a client device; and
a non-transitory computer readable medium storing instructions that are operable, when executed, to:
send an electronic document to the client device over a data network, wherein the electronic document has a document format that is compatible with a document reader application, and wherein the electronic document includes a broker application, an internet application and a dataset;
execute the broker application using resources provided by a virtual machine running in the document reader application, wherein the virtual machine provides resources to the internet application by emulating one or more protocol layers of the client device;
generating, by the internet application, a graphical user interface that includes an interactive form for collecting information from a user accessing the electronic document using the document reader application;
providing, from the internet application to the broker application, the received information provided by the user to the interactive form; and
using the broker application to store the information in the dataset that is included in the electronic document.

16. The system of claim 15, wherein the client device further comprises:
a display device configured to display the graphical user interface generated by the internet application; and
a user interface device configured to receive input from the user via the graphical user interface.

17. The system of claim 15, wherein the client device further comprises a first client device configured to send the electronic document to a second client device via e-mail.

18. The system of claim 15, wherein:
the received information comprises data generated by the internet application; and
the broker application is adapted to extract data from the dataset and provide the extracted data to the internet application.

19. The system of claim 15, wherein the broker application is adapted to store the received information in the electronic document by invoking scripts embedded in the document reader application.

* * * * *